US005381021A

United States Patent [19]

Polidoro

[11] Patent Number: 5,381,021

[45] Date of Patent: Jan. 10, 1995

[54] SHEET ALIGNMENT DEVICE HAVING A DISPLAY FOR INDICATING A REASON FOR REJECTING THE SHEET

[75] Inventor: Roberto Polidoro, Geneva, Switzerland

[73] Assignee: Mars Incorporated, McLean, Va.

[21] Appl. No.: 71,303

[22] Filed: Jun. 2, 1993

[30] Foreign Application Priority Data

Jun. 6, 1992 [CH] Switzerland .................... 01789/92-8

[51] Int. Cl.[6] ............................................ G01N 21/86

[52] U.S. Cl. ........................................ 250/561; 377/8; 271/251

[58] Field of Search ........................... 250/561, 223 R; 356/386, 378; 377/8; 209/539, 534, 551; 271/251, 13

[56] References Cited

U.S. PATENT DOCUMENTS 4,426,073 1/1984 Mizuma ............................... 271/251
4,971,309 11/1990 Reid-Green .......................... 271/251
4,977,583 12/1990 Gorgone ................................. 377/8
5,162,857 11/1992 Higeta et al. ....................... 271/251

FOREIGN PATENT DOCUMENTS 0019723 12/1980 European Pat. Off. .
786014 8/1935 France .
2628889 4/1977 Germany .
58-183551 10/1983 Japan .
59-26840 2/1985 Japan .
2063830 6/1981 United Kingdom .
2213105 8/1989 United Kingdom .
9110975 7/1991 WIPO .

*Primary Examiner*—David C. Nelms
*Assistant Examiner*—Que T. Le
*Attorney, Agent, or Firm*—Davis Hoxie Faithfull & Hapgood

[57] ABSTRACT

An automatic banknote machine includes a selector for receiving rectangular sheets, in particular, banknotes, and for conveying them along for further processing. The selector comprises an input channel into which a bill is introduced, a conveying mechanism for conveying the bill along the input channel, the conveying mechanism including a device, e.g., a skewed roller, for pressing an edge of the bill against a lateral reference surface thereby aligning the bill in the input channel, and a mechanism for verifying the position of the bill as being pressed against the lateral reference surface once the bill has been brought completely into the input channel. In a preferred embodiment the mechanism for verifying the position of the bill comprises a pair of position detectors, such as photodetectors, which are placed in proximity to the reference surface but are spaced apart from one another by a distance which is less than the length of the smallest bill which will be processed by the automatic banknote machine- Only if both of the position detectors detect the presence of the bill at the same time will there be verification that the bill is aligned properly in the input channel.

14 Claims, 1 Drawing Sheet

SHEET ALIGNMENT DEVICE HAVING A DISPLAY FOR INDICATING A REASON FOR REJECTING THE SHEET

BACKGROUND OF THE INVENTION

The present invention relates to selectors for rectangular sheets, in particular, banknotes which can be introduced into machines which are automatically capable of recognizing them, validating them and processing them during a transaction.

This type of automatic machine, called a selector hereinafter, is limited at this time, in general, to the proper processing of banknotes as well as other valuable documents, such as certain types of checks. These automatic machines may also find application in the future in machines designed to process other paper documents such as deeds, bills of exchange, discount bills, or other documents used in financial transactions, as well as to interpret orders issued to effect such transactions or operations.

The selector comprises a bill conveying device located at an input channel. This conveying device is generally triggered by a system detecting the introduction of the bill in an introduction orifice. This conveying device may include one or several rollers or a central belt. Authentication tests are generally conducted in a second section of the selector, located after the input channel.

For the bill to be processed correctly in this second section, the conveying device conveys the bill into the second section of the selector. For this verification procedure to be carried out correctly, it is necessary for the bill to arrive in a precisely aligned fashion. This alignment is evaluated against a reference surface against which one edge of the bill comes to lie. The recognition and authentication device located in the second section of the selector is able to analyze the grain of the paper, its watermark, its color and the imprinted images. If the left edge of the bill does not coincide with the reference surface, the conveying device feeds the bill in a faulty position and the recognition device is not able to recognize or to validate the bill as it attempts to compare the bill with reference models whose characteristics were previously stored in memory. It may in that case reject it erroneously.

In general, where the selector accepts several types and therefore several sizes of bills, the introduction orifice is generally wider than the bill introduced by the user. As a result, a risk generally exists that the bill will be misaligned with respect to the reference surface, resulting in the inconvenience described above.

In known systems, different devices are found which make it possible to align the bills correctly after they have been introduced into the machine- These devices include in particular one or several rollers which convey the bill. These rollers can be identical to those of the conveying device mentioned earlier and are themselves driven by a motor which is started up when one or several detection systems, comprising for example a transmitter and a receiver of a light ray placed across the introduction orifice, detect the bill which the user is in the process of introducing. The rotational axis of these rollers is in principle perpendicular to the direction of the reference edge; however, some of these rollers will be able to rotate around an axis which is slightly offset from that direction so as to press the bill against the reference edge. Patent document UK-A-2,063,830 describes an example of such a device.

In another conveying system, called a central-belt conveying system, a single conveying means causes the bill to advance without attempting to align it against the reference surface. This system can also be used to convey the bill into the second section of the selector. In this case, the bill will be conveyed so that the area of said bill which is most frequently folded when it is kept in a billfold lies on this belt as this area is always more or less damaged and does not lend itself well to paper-grain recognition operations and other optical authentication tests which are carried out in this second section of the selector.

In the conveying systems which have just been described, there does not exist any device verifying whether the alignment is indeed correct. Since the alignment devices are not perfect, it is sometimes possible that the bills are not aligned properly. This leads to errors in the results indicated by the authentication device. Consequently, not only authentic bills may be rejected, but also, albeit not as easily, counterfeit bills may be accepted by an automatic machine.

Summary of the Invention

These disadvantages are eliminated in accordance with the present invention which provides a selector for rectangular paper sheets, in particular, banknotes, comprising an input channel into which a bill is introduced, a conveying mechanism for conveying the bill along the input channel of the selector, the conveying mechanism including a device, e.g., a roller which is skewed relative to the conveying direction, for pressing an edge of the bill against a lateral reference surface thereby aligning the bill in the input channel, and a mechanism for verifying the position of the bill as being pressed against the lateral reference surface once the bill has been brought completely into the input channel.

The object of the system proposed by the invention is to be able to verify accurately whether or not the bills introduced into the machine are correctly aligned.

In one embodiment of the invention the mechanism for verifying the position of the bill is based on the utilization of a plurality of detectors judiciously placed within the bill introduction channel.

In a particular embodiment of the invention, there are two such detectors, located in proximity to the reference surface of the introduction channel.

In one particular embodiment of the invention, the distance between these two detectors is selected to be slightly less than the length of the smallest bills for which the selector is to be used, i.e., the characteristics of which are stored in the memory of the second section of the selector. In this embodiment, the bill is accepted for conveying into the second section for authentication only if it simultaneously actuates the two detectors at a given moment by the action of the bill conveying mechanism.

In another embodiment of the invention, a specific warning signal is emitted when the verification mechanism concludes that the alignment is not correct. This signal may produce the display of a message that can be understood by the user, advising him of the reason for which his bill is being rejected and leading him to introduce it more carefully in his next attempt. This message renders the machine less forbidding to users and increases its acceptance by them.

In a special embodiment of the invention, at least one of the detectors is provided with an electric contact which is closed in rest position in the absence of a bill and which is opened by the bill as it passes.

In another embodiment of the invention, at least one of the detectors comprises at least one transmitter of a light ray matched with a photo-electric receptor. The interposition of the bill obstructs the light ray and the receptor thus detects the presence of the bill.

DESCRIPTION OF THE DRAWINGS

The advantages of the invention will be better understood in the following detailed description pertaining to specific embodiments of the invention and referring to the attached figures in which.

DETAILED DESCRIPTION OF PREFERRED EMBODIMENTS

Figure 1:
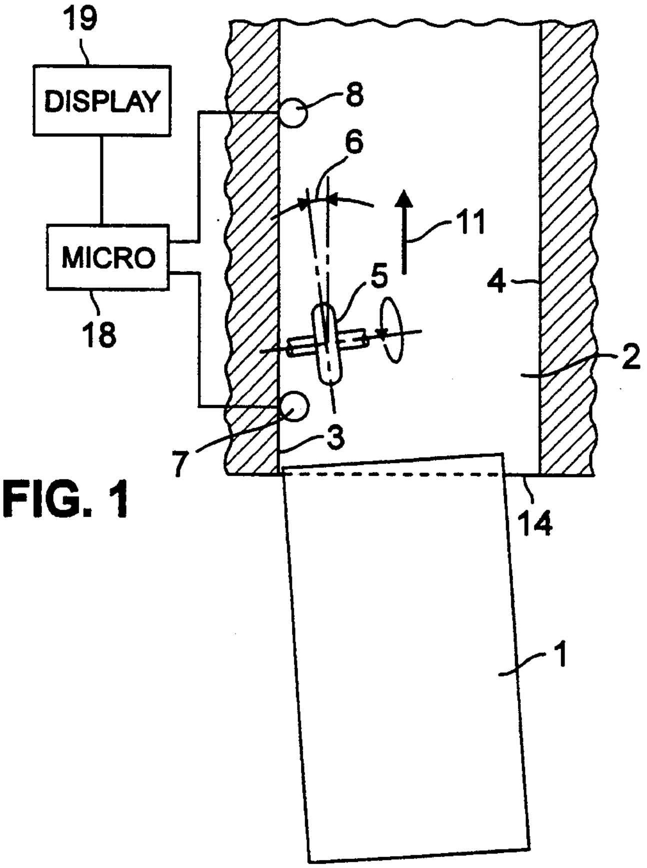
FIG. 1 shows the input channel of a selector, seen from above.

FIG. 1 shows the section of an automatic machine in which a bill 1 is introduced, seen from above. The input channel 2 has two lateral surfaces 3 and 4. Surface 3 serves as a reference guide for the alignment of bill 1. A roller 5 the plane of which forms an angle between, e.g., 10° and 15°, with the direction 11 of the input channel 2 acts upon the bill 1 when it arrives at its level.

Figure 2:
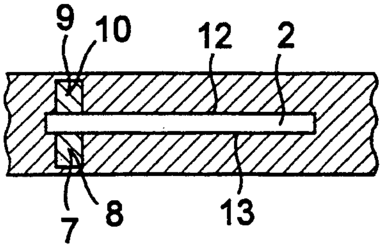
FIG. 2 is a front view of the introduction orifice of the selector shown in FIG. 1.

FIG. 2 shows a front view of the introduction orifice of the selector of FIG. 1.

Bill 1 is clamped between roller 5 and plane 13 of the input channel. This roller 5 is driven by a motor which is not shown and which rotates so that the bill advances in the direction indicated by arrow 11. Two photo-electric detectors 7 and 8, illuminated by the two light emitters 9 and 10, which may comprise, e.g., electro-luminescent diodes, whose rays are perpendicular to the planes 12 and 13 of the input channel 2 are located in the channel 2.

The distance between the photo-electric detectors 7 and 8 is less than the length of the smallest bill 1 to be processed. These photo-electric detectors 7 and 8 are located very close to the reference surface 3. When the user introduces his bill 1 into the introduction orifice 14 of the input channel 2, the bill 1 is conveyed by the roller 5 and is pushed against the reference surface 3 because of the inclination of the plane of roller 5. Bill 1 gradually aligns itself against the reference surface 3 as it advances. There comes a moment when the bill 2 interrupts the light rays received by both photo-electric detectors 7 and 8. For the bill 1 to be aligned correctly, it is necessary that the two photo-electric detectors 7 and 8 be obstructed at the same time by the bill 1. If this condition is not met, it means that the bill 1 has not aligned itself properly in the input channel 2. A logic circuit or a microprocessor circuit 18 receives the signals from the two photo-electric detectors 7 and 8 and in that case supplies a signal causing the bill 1 to be refused and to be returned. The microprocessor 18 can also supply a signal to a display 19, to indicate why the bill is being returned. For example, the display 19 can indicate that the bill is being returned because it was not aligned properly. Such a bill can be reinserted.

Aligning devices other than the one indicated here as an example with the roller 5 may be used without exceeding the scope of the invention.

Figure 3:
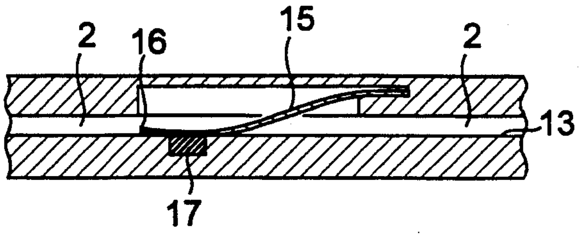
FIGS. 3 and 4 are views in profile of a partial longitudinal section of the input channel in another embodiment of the invention.
Figure 4:
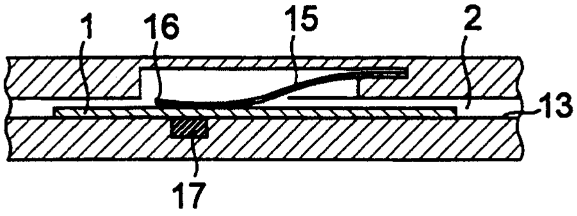

Similarly, FIGS. 3 and 4 show a second embodiment of the invention which uses an electric contact as the detector.

In FIG. 3, a flexible tab 15 is shown in its rest position when no bill is present. Its end 16 is bent back and up to avoid any arching of the end of the bill against this end in case the bill would travel in channel 2 in the direction of the insertion orifice. FIG. 4 shows how bill 1 breaks the contact between the flexible tab 15 and a contact 17 which is level with plane 13. The flexibility of tab 15 is selected so that the bill is able to lift its end 16 with ease.

The invention represents a simple, efficient and inexpensive means making it possible to ensure that the bills introduced are perfectly aligned before being conveyed to the control and authentication point.

While the invention has been described by reference to specific embodiments, this was for purposes of illustration only. Numerous alternative embodiments which are considered to be within the scope of the invention will be apparent to those skilled in the art.

I claim:

1. Selector for rectangular sheets of value, comprising:
   - an input channel into which a bill is introduced,
   - means for conveying said bill along said input channel, said conveying means including means for pressing an edge of said bill against a reference surface thereby aligning said bill in said input channel, and
   - first and second portion detectors for detecting whether the bill is aligned against the reference surface, wherein the means for pressing is located between the first and second position detectors.

2. The selector of claim 1, wherein the position detectors produce signals to be processed.

3. The selector of claim 2, wherein the first and second position detectors are located in proximity to said reference surface of said input channel.

4. The selector of claim 2 wherein at least one of said position detectors comprises a light transmitter coupled with a photoelectric detector which detects the position of said bill when a light ray from said light transmitter is obstructed by the interposition of said bill between said light transmitter and said photoelectric detector.

5. The selector of claim 2, wherein at least one of said position detectors comprises an electric contact, wherein the bill opens the electrical contact.

6. The selector of claim 3, wherein said first and second position detectors are separated by a distance which is slightly less than the length of a smallest bill to be processed by said selector.

7. The selector of claim 4 wherein said light transmitter comprises an electro-luminescent diode.

8. The selector of claim 1 further comprising means for displaying a reason for rejecting said bill.

9. The selector of claim 8, wherein the means for displaying indicates if the bill is rejected for being misaligned.

10. The selector of claim 1, wherein the means for pressing comprises a single roller.

11. Selector for rectangular sheets of value, comprising:
   - an input channel into which a sheet is introduced,
   - a conveyor conveying the sheet along the input channel, the conveyor including means for pressing an edge of the sheet against a reference surface, thereby aligning the sheet in the input channel, and first and second position detectors for detecting whether the sheet is aligned against the reference surface, wherein the means for pressing is located between the first and second position detectors and the first and second position detectors are separated by a distance which is slightly less than the length of a smallest sheet to be processed by the selector.

12. Selector for rectangular sheets of value, comprising:

an input channel into which a sheet is introduced, a conveyor conveying the sheet along the input channel, a reference surface defining in part the input channel, a single roller for pressing an edge of the sheet against the reference surface, aligning the sheet in the input channel, the roller having a rotational axis directed toward the reference surface, and first and second position detectors located along the input channel, proximate the reference surface, for detecting whether the sheet is aligned against the reference surface, wherein the roller is located between the first and second position detectors.

13. Selector for rectangular sheets of value, comprising:

an input channel into which a sheet is introduced, a conveyor conveying the sheet along the input channel, at least one roller for pressing an edge of the sheet against a reference surface, thereby aligning the sheet in the input channel, first and second position detectors for detecting whether the sheet is aligned against the reference surface, and a display for indicating a reason for rejecting the bill.

14. The selector of claim 13, wherein the display indicates if the sheet was misaligned.

* * * * *

UNITED STATES PATENT AND TRADEMARK OFFICE

CERTIFICATE OF CORRECTION

PATENT NO. : 5,381,021

DATED : January 10, 1995

INVENTOR(S) : Polidoro

It is certified that error appears in the above-indentified patent and that said Letters Patent is hereby corrected as shown below:

Claim 1, column 4, line 33, delete "portion" and insert --position--.

Signed and Sealed this

Eleventh Day of July, 1995

Attest:

Bruce Lehman

BRUCE LEHMAN

*Attesting Officer*

*Commissioner of Patents and Trademarks*